Figure 8:
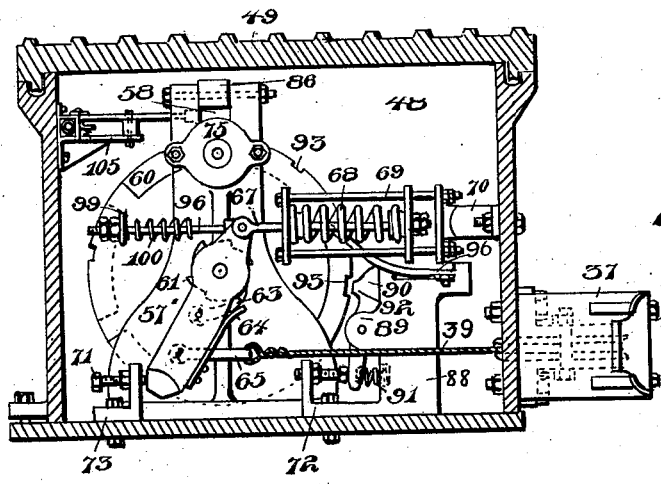

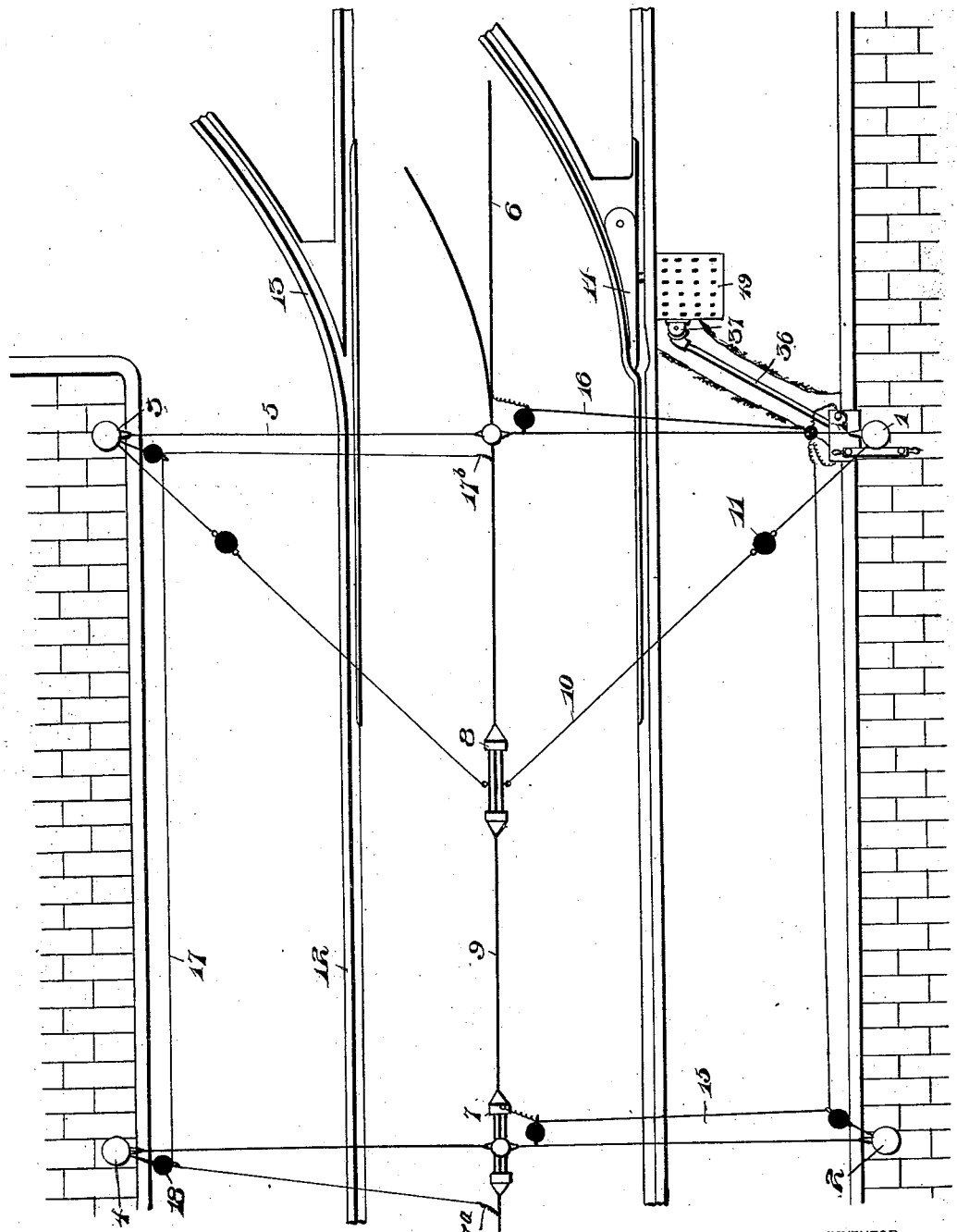

No. 668,662. Patented Feb. 26, 1901.
J. H. SPANGLER.
ELECTRIC SWITCH.
(Application filed Feb. 21, 1900.)
(No Model.) 6 Sheets—Sheet 2.
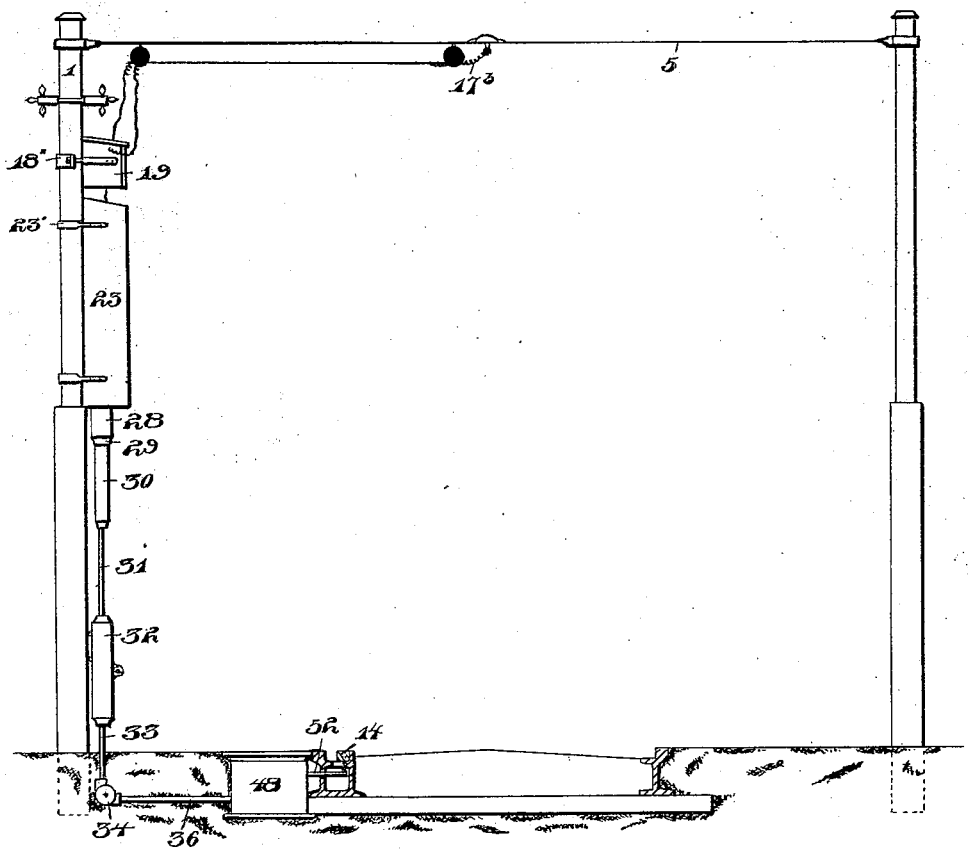
WITNESSES:
INVENTOR
John H. Spangler
BY
ATTORNEYS.

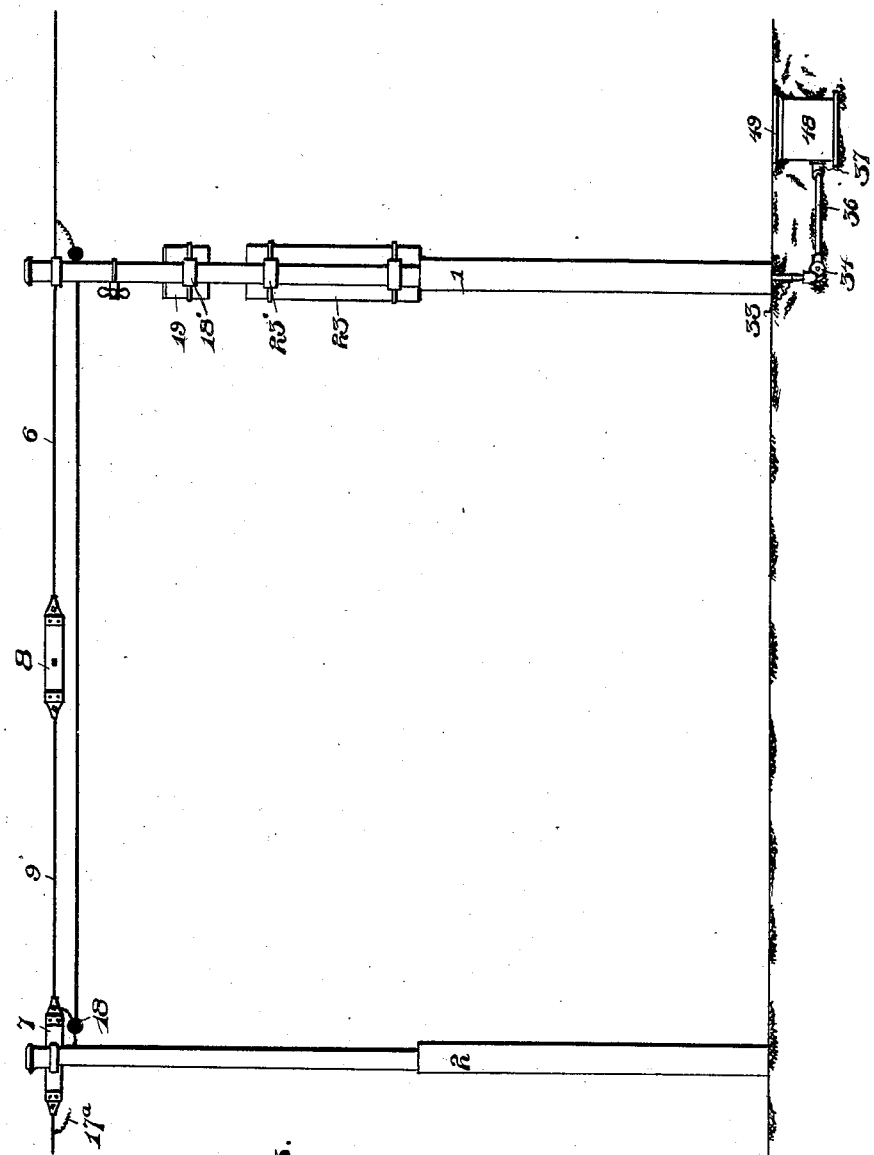

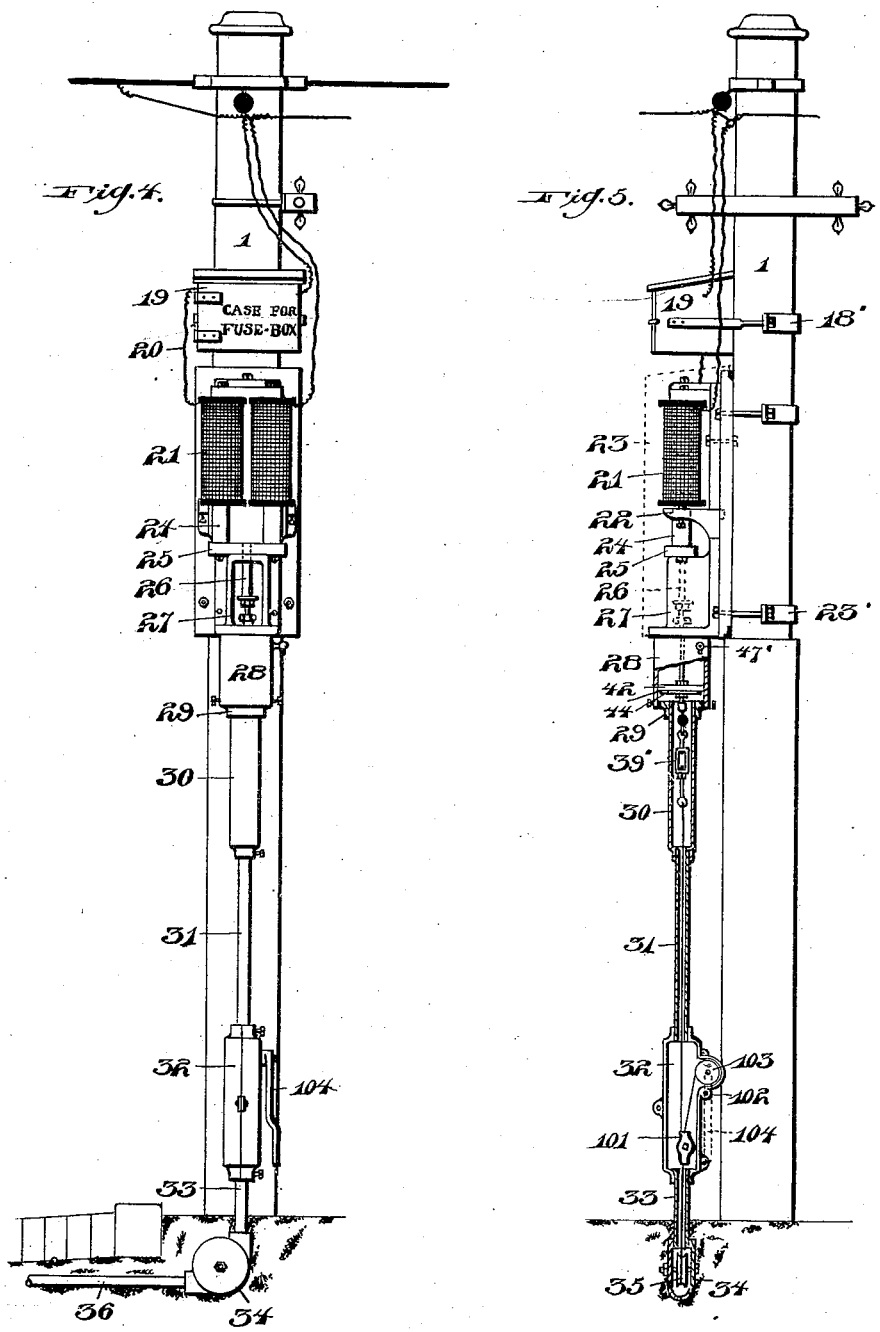

No. 668,662. Patented Feb. 26, 1901.
J. H. SPANGLER.
ELECTRIC SWITCH.
(Application filed Feb. 21, 1900.)
(No Model.) 6 Sheets—Sheet 5.
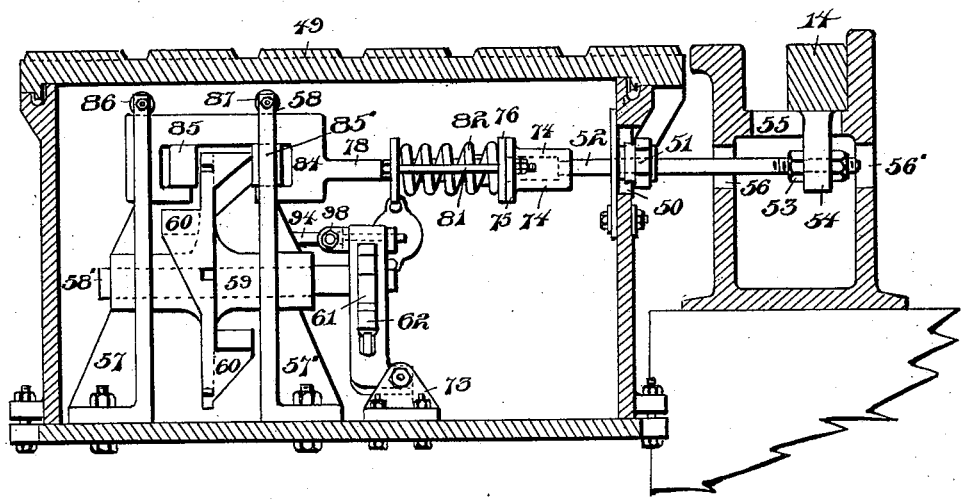
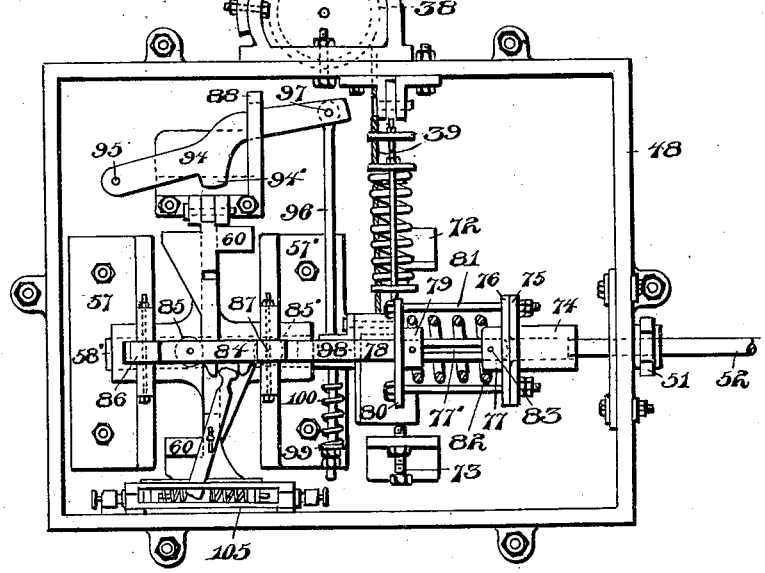
WITNESSES:
INVENTOR
John H. Spangler
BY
ATTORNEYS.

No. 668,662. Patented Feb. 26, 1901.
J. H. SPANGLER.
ELECTRIC SWITCH.
(Application filed Feb. 21, 1900.)

(No Model.) 6 Sheets—Sheet 6.

WITNESSES:

INVENTOR
John H. Spangler
BY
ATTORNEYS.

UNITED STATES PATENT OFFICE.

JOHN H. SPANGLER, OF PITTSBURG, PENNSYLVANIA.

ELECTRIC SWITCH.

SPECIFICATION forming part of Letters Patent No. 668,662, dated February 26, 1901.

Application filed February 21, 1900. Serial No. 6,061. (No model.)

*To all whom it may concern:*

Be it known that I, JOHN H. SPANGLER, a citizen of the United States of America, residing at Pittsburg, in the county of Allegheny and State of Pennsylvania, have invented certain new and useful Improvements in Electric Switches, of which the following is a specification, reference being had therein to the accompanying drawings.
The herein-described invention relates to certain new and useful improvements in electrically-operated switches, and is more particularly adapted to be employed for operating street-railway switches.
The present invention has for its object to construct a switch-operating mechanism connected to the ordinary switch-tongue that will be under control of the motorman of the car and one that will assure a free and easy operation of the switch-tongue to either open or close the switch, as desired; furthermore, to provide novel means to permit the switch-tongue to remain in an inoperative position as the car traverses over the switch in case the switch-tongue has been previously placed in proper position.

My invention further aims to construct an electrically-operated switch mechanism of the above-referred-to class wherein any special mechanism or attachments to the car are entirely dispensed with, thereby simplifying the construction and obtaining advantages that will be hereinafter more particularly pointed out.
The invention further aims to provide the switch-tongue-operating mechanism with yielding connections to prevent the operation of the switch-tongue when the same is obstructed by a hard substance, thereby providing means that will permit the switch-tongue-operating mechanism to yield, preventing the breakage of the parts or throwing the mechanism out of adjustment.

Furthermore, the invention contemplates constructing the switch-tongue-operating mechanism and yielding connections in such a manner that the clogging of the switch-tongue, caused by snow, sleet, mud, or the like, will not prove an impediment to the successful operation of the switch-tongue, but, on the contrary, will offer sufficient resistance and power to remove and automatically clean the switch from obstructions of the character as above stated.

Heretofore the operation of switches of this class has been instantaneous, and the intense shock thus caused is an objectionable feature to the successful operation of inventions appertaining to this art. Furthermore, the electromagnets employed to operate the switch-tongue are usually located in the ground adjacent to or in close proximity to the switch-tongue, thereby causing the electric current to "short-circuit" in damp weather. It is through the novel construction and particular arrangement of the various parts that I overcome the above-referred-to objectionable features, as will be hereinafter more particularly described, and specifically pointed out in the claims.

My invention broadly consists of the interposition of a circuit-breaker in the trolley-wire at a convenient point before the switch-tongue is reached and arranging the overhead wires in such a manner that when the power is applied at the controller when the trolley-wheel is in contact with the circuit-breaker the switch-tongue will automatically operate; and my invention further consists in allowing the switch-tongue to remain in an inoperative position as the trolley is allowed to "drift" over the contact between the circuit-breakers without power or by applying only a small voltage, that will allow the car to pass the circuit-breaker without operating the switch-tongue.

My invention further consists in the novel arrangement of the electromagnets and means interposed between said magnets and switch-throwing mechanism whereby the instantaneous action of the current is checked and a more gradual operation of the switch-tongue obtained.

My invention still further consists in the novel construction, combination, and arrangement of parts, to be hereinafter more fully described, and specifically pointed out in the claims.

In describing the invention in detail reference is had to the accompanying drawings, forming a part of this specification, and wherein like numerals of reference indicate corresponding parts throughout the several views, in which—

Figure 9:
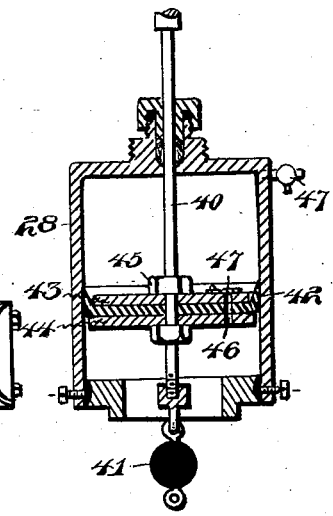
Figures 10, 12:
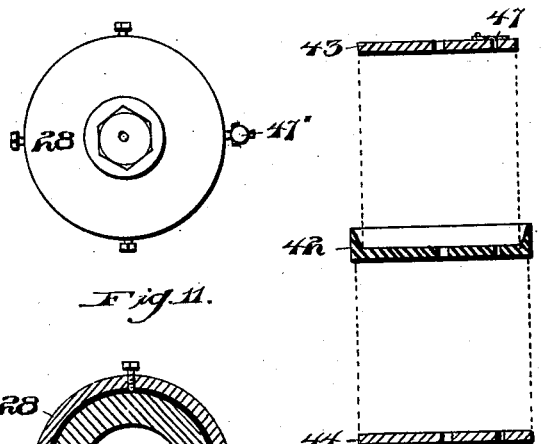
Figure 11:
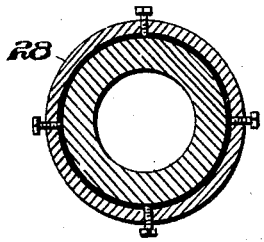
Figure 13:
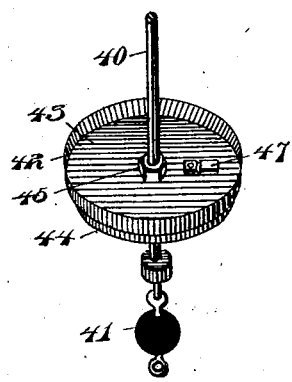

Figure 1 is a top plan view of a portion of the main and switch sections of a railway-track, showing the arrangement of my switch-operating device. Fig. 2 is a front elevation showing the arrangement of my mechanism above and below the surface of the street and also showing a transverse vertical section of a railway-track at the junction of the switch-tongue. Fig. 3 is a side elevation of the same. Fig. 4 is a front view of the arrangement of the electromagnets and the casings carrying the operating-cable. Fig. 5 is a side elevation thereof, partly broken away, with portions in vertical section. Fig. 6 is a transverse vertical sectional view of the casing, showing the arrangement of the switch-tongue-operating mechanism in side elevation. Fig. 7 is a top plan view of the switch-tongue-operating mechanism arranged in the casing with the cover removed. Fig. 8 is a vertical sectional view of the casing, showing a rear elevation of the operating mechanism therein. Fig. 9 is an enlarged vertical sectional view of the air-cylinder and piston. Fig. 10 is a top plan view of the same. Fig. 11 is a longitudinal sectional view thereof. Fig. 12 is a disassembled vertical sectional view of the piston. Fig. 13 is a perspective view of the piston.

Referring to the drawings by reference-numerals, 1, 2, 3, and 4 indicate the supporting-poles for the guy-wires 5, to which is connected the trolley-wire or electrical conductor 6 for supporting the same.

The reference-numerals 7 8 denote a pair of circuit-breakers secured to the trolley-wire 6 and having the dead or circuit-breaking wire 9 interposed between the same.

The reference-numeral 10 indicates a pair of brace-wires for the circuit-breaker 8 and which are each provided with a suitable insulator 11. The dead or circuit-breaking wire 9 is arranged above the main section 12 of the track adjacent to the switch-section 13 and switch-tongue 14 and is connected at one end by means of the auxiliary circuit-forming wire 15 to the magnets, which are connected to the fuse-box, to be hereinafter described. 16 denotes an auxiliary feed-wire between the fuse-box and trolley-wire 6.

The arrangement of the wires 9, 15, and 16 in the manner shown forms the switch-throwing circuit when the trolley is in contact with the wire 9 and the controller operated. This will be evident by the current passing upon the wire 16 to the fuse-box, to the magnets, then upon the wire 15 to wire 9, through the trolley and controller to the ground.

The reference-numeral 17 denotes a circuit-jumper which is connected at each end, as at 17ª and 17ᵇ, to the trolley-wire 6, adjacent to the dead or circuit-breaker wire 9.

The reference-numeral 18 indicates insulators suitably connected to the wires 5, 9, 15, and 16 and jumper 17.

To the pole 1, near the upper end thereof, is secured by means of the clamps 18′ a fuse-box 19, connected by the wire conductor 20 to the solenoid 21, arranged in an insulated casing 23, secured by the clamps 23′ to the pole 1 and supported upon the brackets 22, secured to the back of the casing 23. The solenoids are each provided with a core 24, connected at their lower end to the armature 25, to which is attached the upper end of the link 26, operating through the guide-yoke 27, supported upon the bottom of the casing.

Formed integral with or otherwise secured to the under face of the casing 23 is an air-cylinder 28, having the bottom thereof provided with a centrally-arranged screw-threaded opening registering with a screw-threaded collar 29, in which is secured the upper end of the tubular casing 30, having arranged therein the adjusting means for the operating-cable, to be hereinafter described. The lower end of the said casing 30 is connected to the upper end of the tube 31, secured at its lower end to the top of the enlarged cylindrical casing 32, containing means for mechanically operating the switch-tongue, to be hereinafter described. The lower end of the casing 32 is connected by the tube 33 to the one end of the elbow-shaped casing 34. In the latter is journaled the pulley-wheel 35. The opposite end of the casing 34 is connected by the tube 36 to the casing 37, secured to one side of the rectangular casing, in which is arranged the switch-tongue-operating mechanism. The said casing 37 has suitably journaled therein the pulley-wheel 38.

The reference-numeral 39 indicates the cable, chain, or rod for operating the switch-tongue-operating mechanism and is suitably connected thereto. The cable, chain, or rod 39 passes outwardly through the casing, carrying the switch-tongue-operating mechanism over the pulley-wheel 38, through the tube 36, over the pulley-wheel 35, through the tube 33, casing 32, tube 31, and into the casing 30 and is connected to the lower end of the adjusting turnbuckle 39′, while the upper end of the turnbuckle 39′ is secured to the piston arranged in the air-cylinder 28 and the former is suitably connected by the piston-rod 40 to the link 26. Interposed between the upper end of the turnbuckle 39′ and the piston is an insulator 41.

The piston arranged in the air-cylinder 28 consists of a flexible cup 42, mounted upon the piston-rod 40 and having the sides thereof upon its upward movement frictionally engage the inner face of the cylinder. The cup 42 is arranged upon the rod 40 between two metallic disks 43 44. These metallic disks are of a less diameter than the interior of the cylinder 28 and are secured in position against the flexible cup by means of the nuts 45. The cup and each of the disks are provided with a registering opening or air-passage 46, closed on the upward stroke of the piston by means of the flap-valve 47, this valve being mounted upon the upper face of the disk. The cylinder 28 is further provided with an exhaust-valve 47', secured to the same near the upper end thereof.

The switch-tongue-operating mechanism is arranged within a rectangular casing 48, provided with a removable cover 49 and an opening 50 in one end thereof, in which is secured a stuffing-box 51 for the switch-tongue-operating rod 52, secured at its outer end, as at 53, to the extension 54, which is or may be formed integral with the under face of the switch-tongue 14. The rail-section is provided with a transverse slot 55 to permit of the operation of the extension 54 and further provided with a recess 55' and the openings 56 56' to permit of the operation of the rod 52.

Mounted upon the bottom of the casing 48 are a pair of supporting-standards 57 57', each provided with an opening 58 in the upper portion thereof, and journaled in these standards 57 57' is a shaft 58', upon which is mounted the operating-wheel 59, provided with a series of throwing-lugs 60, arranged alternately upon each side of the wheel. Secured to one end of the shaft 58' is a ratchet-wheel 61 and an operating-lever 62 therefor, carrying the pawl 63, retained in position against the ratchets of the wheel 61 by means of the spring 64. The lower end of the lever 62 is connected, by means of the link 65, carried thereby, to the cable, chain, or rod 39, while the upper end of the said lever 62 is pivotally secured to the rod 67, carrying the compression-spring 68, both of which are mounted within and supported by the adjustable yoke 69, secured at its outer end to the supporting-lug 70, connected to the side of the casing 48. The movement of the lever 62 is limited by means of the adjusting stop-screws 71, arranged in the brackets 72 73, secured upon the bottom of the casing 48.

The inner end of the rod 52 is connected to one end of the sleeve 74, provided at its opposite end with a flange 75, abutting against the flange 76 of the sliding collar 77, mounted upon the slotted portion 77' of the main throwing-rod 78. The rod 78 has also mounted thereon a suitable distance from the collar 77 a sliding collar 79, provided with a flange 80, which is connected by means of the adjusting tie-rods 81 to the flanges 75 76. Arranged between the tie-rods and surrounding the collars 77 79 is a coiled buffing-spring 82. Each of the collars 77 79 is provided with a guide-pin 83, operating in the slotted portion of the rod 78. The inner end of the rod 78 terminates into a sliding yoke 84, carrying a pair of suitably-disposed antifriction-rollers 85 85', which are engaged by the throwing-lugs 60. This yoke 84 operates within the opening 58 of the standards and is retained in position by the antifriction-rollers 86 87, which are rotatably mounted at the top of the standards and engage the upper face of the yoke. The lower wall of the opening 58 forms a bearing for the under face of the yoke 84.

Arranged upon the bottom of the casing 48 is a supporting-bracket 88, provided with a pair of apertured lugs 89, to which is pivotally secured the lock-lever 90, retained in an inoperative position by means of the spring 91, connected to the bracket 88 and bearing against the lower end of the lock-lever 90.

The reference-numeral 92 denotes an engaging-lug adapted to be seated in one of the notches 93, arranged at suitable intervals upon the periphery of the operating-wheel 59. The lock-lever 90 is brought into engagement with the wheel 59 by means of the operating-lever 94, provided with the engaging lug 94' and is pivotally connected at one end to the stud 95, and its opposite end extends through an opening in the bracket 88 and is pivotally connected to the curved operating-bar 96, as at 97. The bar 96 extends across the casing 48 and is connected to the upper end of the lever 62 by means of the keeper 98, and the free end of the bar 96 operates through the bracket 99 and carries a compression-spring 100.

In Figs. 4 and 5 a means is shown for operating the switch in case an occasion may arise when the magnets were out of order or some trouble occurring with the switch-throwing circuit, and it consists of a clamp 101, secured to the cable 39, and an auxiliary cable 102, connected to the clamp, and a sheave 103, suitably mounted in the casing 32 and operated by the lever 104, connected thereto and extending outside of the casing. By elevating the lever 104 the sheave is rotated, the cable 39 is raised, and the switch-throwing mechanism operated in the same manner as by the switch-throwing circuit for moving the switch-tongue.

In Fig. 5 is shown an operating mechanism 105 for a signaling device and which will be fully set forth in a copending application, this mechanism being operated by means of the antifriction-rollers carried by the yoke 84.

The operation of the device is as follows: Assuming that the switch-tongue is in position as shown in Fig. 1, the trolley drifts over the breaker 7 into contact with the dead or circuit-breaking wire 9, when the motorman opens the controller and creates the switch-throwing circuit. This circuit is formed as follows: from the trolley-wire 6 upon the conductor 16 to the fuse-box, to the magnets, from the same upon the conductor 15 to the dead or circuit-breaking wire 9, through the trolley and the controller to the ground. Upon the formation of the switch-throwing circuit the solenoid is energized, drawing the core upwardly, carrying the armature 25 therewith, elevating the cable 39, operating the lever 62, moving the ratchet-wheel 61, and revolving the operating-wheel 59 until the same is locked by the engaging lug 93 of the lock-lever. The operation of the lever 62 imparts motion to the bar 96 and brings the lever 94 into engagement with the lock-lever 90. When the wheel 59 is operated, one of the throwing-lugs 60 engages either one of the antifriction-rollers 85 85' and operates the rods for throwing the switch-tongue.

For example, assuming that one of the throwing-lugs 60 is adapted to engage the roller 85, causing an inward movement to be imparted to the rod 78, carrying the rod 52 therewith and moving the switch-tongue, when the switch-throwing circuit is broken by the trolley passing from the dead or circuit-breaking wire 9 the armature 25 is released and the piston falls by gravity, assuming its normal position, lowering the cord or cable 39 and permitting the various levers to resume their normal positions by the action of the compression-springs.

The foregoing refers to the general operation of the device; but the operation of the various parts will now be each separately described.

Assuming that the switch-throwing circuit is formed as heretofore stated, the solenoid is energized, causing the elevation of the core and armature, and which will operate the piston within the air-cylinder for cushioning the stroke of the switch-tongue. This is obtained by reason of the cup 42 on its upward movement creating an air-cushion in the upper part of the air-cylinder, the sides of the cup extending outwardly and frictionally engaging the inner face of the cylinder and the air exhausting through the exhaust-valve 47'. When the armature is released, the piston will fall by gravity, the sides of the cup contracting from engagement with the inner face of the cylinder, and the flap-valve will open, thus preventing any resistance from the air on the downward movement of the piston. When the piston is elevated, the air in the upper part of the cylinder will close the flap-valve. When the piston is elevated by means of the armature, the cable, chain, or rope 39 is carried therewith, passing over the pulley-wheels 35 38, imparting motion to the lever 62, causing the pawl 63 to engage the teeth of the ratchet-wheel 61 and revolve the same, the pawl being held in engagement with the teeth of the ratchet-wheel by the spring 64. When the lever is operated by the cable 39, the spring 68 is compressed and held in such position until the armature is released. The spring will then expand and return the lever 62 to its normal position, as shown in Fig. 8. It will be evident that when the ratchet-wheel is revolved the shafts 58' will be turned, carrying the operating-wheel 59 therewith. When the lever 62 is operated, it will carry the rod 96 therewith, compress the spring 100, and cause the rod 96 to operate the lever 94, bringing the lug 94' into engagement with the lock-lever 90, and force the engaging lug 92 into one of the notches of the operating-wheel, locking the same. The release of the lever 62 is caused by the breaking of the switch-throwing circuit. It will then operate in an opposite direction by the expanding of the spring 68, moving the lever 94 from engagement with the lock-lever 90 and permitting the expansion of the spring 91, withdrawing the lug 92 from engagement with the wheel 59' and allowing of the same to be operated, when the switch-throwing circuit is again formed and the same operation will be repeated.

The rods 78 and 52 are provided with a buffing means, consisting of the sleeve 74, collars 77 79, flanges 75 76 80, spring 82, and tie-rods 81 for the following function: Assuming that there is an obstruction to prevent the operation of the switch-tongue, the end of the rod 78 will be forced into the sleeve 74, owing to the compression of the spring 82 by the flange 79—that is, if the rod 78 is moved in an outward direction. If the rod is moved in an opposite direction it will carry the flange 76 and collar 77 therewith and compress the spring 82. In both cases no movement will be imparted to the rod 52, thus providing yielding connections that will allow of the operation of the switch-throwing mechanism without injury thereto when the switch-tongue is obstructed by an object of great resistance interposed between the tongue and the rail. The spring 82 is of such strength that when the rod 78 is operated movement will be imparted to the rod 52 when the switch-tongue is not constructed in the manner referred to.

It will be observed that when the solenoid is energized by the formation of the switch-throwing circuit, the mechanism for moving the switch-tongue is operated and the same automatically locked until the circuit is broken, the release of the lever 62 causing the disengagement of the engaging lug and the locking-lever, this operation being automatic also; but when the operating mechanism is released the switch-tongue does not move, but remains in the position to which it is thrown by the formation of the switch-circuit, the tongue only being moved when the mechanism is operated. It will also be observed that by the arrangement of the insulator 41 between the piston and cable 39 it will prevent short-circuiting. By providing the throwing-lugs 60 on each side of the operating-wheel in an alternate manner it will permit of the switch-tongue to be moved in either direction, and, furthermore, by the arrangement of the yielding connections upon the rods 52 and 78 no resistance to prevent the operation of the mechanism is afforded by any obstruction, as heretofore stated.

I of course do not wish to limit myself to the specific construction set forth herein, as various changes may be made in the details of construction without departing from the general spirit of my invention.

Having thus fully described my invention, what I claim as new, and desire to secure by Letters Patent, is—

1. In a switch-operating mechanism, a switch-tongue-operating mechanism, a solenoid connected thereto and adapted when energized to operate said mechanism, and pneumatic means for cushioning the movement of the core of said solenoid.

2. In a switch-operating mechanism, the combination with a switch-tongue and an electrical conductor, of an operating mechanism connected to and adapted to operate said tongue, a solenoid connected to said mechanism and said electrical conductor and adapted when energized to cause the operation of said mechanism thereby moving said switch-tongue, and means for cushioning the movement of the core of said solenoid when the latter is energized.

3. In a switch-operating mechanism for electrical railways, the combination with an electrical conductor and a circuit-breaker suitably connected thereto, of a switch-tongue-operating mechanism connected to and adapted to operate a switch-tongue, a solenoid interposed between said mechanism and said circuit-breaker, connected thereto and to said electrical conductor and adapted when energized to operate said mechanism causing thereby the throwing of the switch-tongue in opposite directions, and pneumatic means for cushioning the movement of the core of said solenoid.

4. In a switch-operating mechanism, the combination with an electrical conductor, of a circuit-breaker suitably connected thereto, a switch-tongue-operating mechanism, a solenoid adapted when energized to operate said mechanism for throwing a switch-tongue, connections between said solenoid, said circuit-breaker and electrical conductor for energizing the solenoid when a trolley of a car is in contact with said circuit-breaker and the controller of the trolley operated, and means for cushioning the movement of the core of said solenoid.

5. In a switch-throwing mechanism, a switch-tongue-operating mechanism suitably connected to and adapted to operate a switch-tongue, a solenoid, suitable connection between said solenoid and a source of electrical supply for energizing the former, forming thereby a switch-throwing circuit for operating said mechanism and throwing a switch-tongue in either direction, and pneumatic means adapted to cushion the movement of the core of said solenoid.

6. In a switch-throwing mechanism, the combination with the main and switch rail sections of a railway-track and an electrical conductor, of a circuit-breaker suitably connected to said conductor, a switch-tongue-operating mechanism, a solenoid connected to said mechanism for operating the same, connections between said circuit-breaker, said conductor and said solenoid for forming a switch-throwing circuit energizing the said solenoid causing the operation of said mechanism, and means interposed between said solenoid and said mechanism for cushioning the movement of the core of the former.

7. In a switch-operating mechanism, the combination with an electrical conductor, of a circuit-breaker suitably connected thereto, a switch-tongue-operating mechanism, a solenoid arranged above the ground and adapted when energized to operate said mechanism, connections arranged above the ground between said circuit-breaker, solenoid and conductor for forming a switch-throwing circuit to operate the core of said solenoid when a trolley is in contact with said breaker and the controller of the trolley operated causing thereby the operation of said mechanism, and means for cushioning the movement of the core of said solenoid.

8. In a switch-operating mechanism for electrical railways, the combination with an electrical conductor, of a circuit-breaker suitably connected thereto, a switch-tongue-operating mechanism, a solenoid arranged above the ground and suitably connected to said mechanism for operating the same when said solenoid is energized, connections between said solenoid and said conductor, connections between said solenoid and said circuit-breaker, said connections forming a switch-throwing circuit for operating said mechanism when a trolley is in contact with said circuit-breaker and the controller of the trolley operated, and pneumatic means for cushioning the operation of the core of said solenoid.

9. In a switch-operating mechanism for electrical railways, the combination with an electrical conductor, of a circuit-breaker suitably connected thereto, a switch-tongue-operating mechanism, an operating cable, chain or rod connected to said mechanism, a pneumatic cushioning device connected to said cable, chain or rod, and means including a solenoid arranged above the ground and connected to said cushioning device for forming a switch-throwing circuit for operating said cable, chain or rod causing thereby the operation of the switch-tongue-operating mechanism.

10. The combination with the main and switch rail sections of a railway-track provided with a suitable switch-tongue and an electrical conductor, of a switch-tongue-operating mechanism connected to said switch-tongue, yielding connections carried by said mechanism to prevent injury thereto when the switch-tongue is obstructed, operating means for said mechanism, a solenoid arranged above the ground and connected to said operating means, a circuit-breaker connected to said conductor, connections between said circuit-breaker, conductor and solenoid for forming a switch-throwing circuit energizing the said solenoid for operating said means causing thereby the operation of the said switch-tongue-throwing mechanism, and means for cushioning the operation of the core of said solenoid.

11. In a switch-throwing mechanism, the combination with an electrical conductor and the main and switch rail sections of a railway-track provided with a suitable switch-tongue, of an operating-rod connected to said tongue, a main throwing-rod suitably connected to said operating-rod, operating means for said main throwing-rod suitably connected thereto, a cable, chain or rod connected to said means and adapted to operate the same, a circuit-breaker suitably connected to said conductor, electrical means arranged above the ground and connected to said cable, chain or rod and said circuit-breaker and conductor for forming a switch-throwing circuit for operating said cable, chain or rod causing the operation of said switch-tongue, and pneumatic means interposed between said electrical means and said cable, chain or rod for cushioning the movement of the former.

12. In a switch-operating mechanism, the combination with an electrical conductor and the main and switch rail sections of a railway-track provided with a suitable switch-tongue, of an operating-rod connected to said tongue, a main throwing-rod suitably connected to said operating-rod, a sliding yoke suitably connected to said main throwing-rod and provided with a pair of antifriction-rollers, operating means engaging said rollers and adapted to operate said yoke causing the movement of the said rods and switch-tongue in either direction, a cable, chain or rod connected to said means for operating the same, a circuit-breaker suitably connected to said conductor, electrical means arranged above the ground and connected to said cable, chain or rod and to said circuit-breaker and conductor for forming a switch-throwing circuit for operating said cable, chain or rod causing the operation of said operating means, and pneumatic means arranged above the ground for cushioning the operation of said electrical means.

13. In a switch-throwing mechanism, the combination with an electrical conductor and the main and switch rail sections of a railway-track provided with a suitable switch-tongue, of an operating-rod connected to said tongue, a main throwing-rod suitably connected to said operating-rod, a sliding yoke connected to the main throwing-rod and provided with a pair of antifriction-rollers, an operating-wheel adapted to engage said rollers and operate said yoke causing thereby the operation of said rods, operating means for said wheel, a cable, chain or rod connected to said means for operating the same, a circuit-breaker suitably connected to said conductor, electrical means connected to said cable, chain or rod and to said circuit-breaker and conductor for forming a switch-throwing circuit for operating said cable, chain or rod causing the operation of said means, and pneumatic means for cushioning the movement of said electrical means.

14. In a switch-throwing mechanism, the combination with an electrical conductor and the main and switch rail sections of a railway-track provided with a suitable switch-tongue, of an operating-rod connected to said tongue for operating the same, a main throwing-rod suitably connected to said rod, a sliding yoke connected to the said main throwing-rod and provided with a pair of antifriction-rollers, an operating-wheel, a series of throwing-lugs formed integral with said wheel and adapted to alternately engage said rollers causing thereby the operation of said yoke and rods, operating means for said wheel, a cable, chain or rod connected to said means for operating the same, a circuit-breaker suitably connected to said conductor, electrical means connected to said cable, chain or rod and to said circuit-breaker and conductor for forming a switch-throwing circuit for operating said cable, chain or rod causing the operation of said means, and pneumatic means arranged above the ground for cushioning the movement of said electrical means.

15. In a switch-throwing mechanism, the combination with an electrical conductor and the main and switch rail sections of a railway-track provided with a suitable switch-tongue, of an operating-rod connected to said tongue, a main throwing-rod suitably connected to said rod for moving the same, a sliding yoke suitably connected to said main throwing-rod for operating the same and provided with a pair of antifriction-rollers, an operating-wheel adapted when rotated to engage said rollers and operate said yoke, a spring-actuated lever suitably connected to said wheel for rotating the same, an adjustable cable, chain or rod connected to said lever for operating the same, a circuit-breaker suitably connected to said conductor, and means connected to said cable, chain or rod and to said circuit-breaker and conductor for forming a switch-throwing circuit for operating said cable, chain or rod.

16. In a switch-operating mechanism, the combination with an electrical conductor and the main and switch rail sections of a railway-track provided with a suitable switch-tongue, of an operating-rod connected to said tongue, a main throwing-rod suitably connected to said rod for moving the same, a sliding yoke suitably connected to said main throwing-rod for operating the same and provided with a pair of antifriction-rollers, an operating-wheel adapted when rotated to engage said rollers and operate said yoke, a spring-actuated lever suitably connected to said wheel for rotating the same, a cable, chain or rod connected to said lever for operating the same, means for automatically locking and releasing said wheel when said lever is operated, a circuit-breaker suitably connected to said conductor, and means connected to said cable, chain or rod and to said circuit-breaker and conductor for forming a switch-throwing circuit for operating said cable, chain or rod.

17. In a switch-throwing mechanism, the combination with an electrical conductor and the main and switch rail sections of a railway-track provided with a suitable switch-tongue, of an operating-rod connected to said tongue, a main throwing-rod suitably connected to said rod for moving the same, a sliding yoke suitably connected to the main throwing-rod for operating the same and provided with a pair of antifriction-rollers, an operating-wheel adapted when rotated to engage said rollers and operating said yoke, a spring-actuated lever suitably connected to said wheel for rotating the same, a chain, cable or rod connected to said lever for operating the same, means for automatically locking and releasing the said wheel when said lever is operated, a circuit-breaker suitably connected to said conductor, means connected to said chain, cable or rod for cushioning the movement of said switch-tongue, and means connected to said cushioning means and to said circuit-breaker and conductor for forming a switch-throwing circuit for operating said chain, cable or rod.

18. In a switch-throwing mechanism, the combination with an electrical conductor and the main and switch rail sections of a railway-track provided with a suitable switch-tongue, of an operating-rod connected to said tongue, a main throwing-rod suitably connected to said rod for moving the same, a sliding yoke suitably connected to the main throwing-rod for operating the same and provided with a pair of antifriction-rollers, an operating-wheel adapted when rotated to engage said rollers and operate said yoke, a spring-actuated lever suitably connected to said wheel for rotating the same, a cable, chain or rod connected to said lever for operating the same, means for automatically locking and releasing said wheel when said lever is operated, a circuit-breaker suitably connected to said conductor, means connected to said cable, chain or rod for cushioning the movement of said switch-tongue, a solenoid suitably connected to said cushioning device, and connection between said solenoid and said circuit-breaker for forming a switch-throwing circuit for operating said chain, cable or rod.

19. In a switch-throwing mechanism, the combination with means for forming a switch-throwing circuit, of a switch-tongue-operating mechanism operated when a circuit is formed and comprising in its construction a pair of standards mounted in a suitable casing, an operating-wheel journaled in said standards, a sliding yoke mounted in said standards adapted to be operated in opposite directions by said wheel, connections between said yoke and a switch-tongue, operating means for said wheel, connected thereto and to the means for forming a switch-throwing circuit, and pneumatic means for cushioning the movement of said switch-tongue.

20. In a switch-throwing mechanism, the combination with means for forming a switch-throwing circuit, of a switch-tongue-operating mechanism comprising in its construction a pair of standards mounted in a suitable casing, an operating-wheel journaled in said standards, a series of alternately-arranged throwing-lugs formed integral with said wheel, a sliding yoke mounted in said standards and carrying a pair of antifriction-rollers adapted to be engaged by the said lugs for alternately operating said yoke in opposite directions, a spring-actuated lever for operating said wheel, operating means for said lever, means for automatically locking and releasing said wheel when said lever is operated, means connected to said yoke for operating a switch-tongue, a solenoid adapted when energized by said switch-tongue-throwing circuit to operate said means, and pneumatic means for cushioning the movement of the core of said solenoid.

21. In a switch-throwing mechanism, the combination with the means for forming a switch-throwing circuit, an electrical conductor, and the main and switch rail sections of a railway-track provided with a suitable switch-tongue, of a solenoid energized by said switch-throwing circuit, a rod 52 connected to said tongue and adapted to operate the same, a main throwing-rod, operating mechanism suitably connected to said main throwing-rod for imparting motion thereto when said solenoid is energized by the switch-throwing circuit, yielding connections mounted upon said rod and adapted to prevent the operation of said rod 52 when the switch-tongue is obstructed to prevent injury to the operating mechanism, and pneumatic means for cushioning the operation of the core of the solenoid.

22. In a switch-throwing mechanism, the combination with a suitable switch-tongue connected to an operating means therefor, of an electrical conductor, a circuit-breaker suitably connected thereto, a solenoid arranged above the ground, means for forming a switch-throwing circuit for energizing said solenoid causing the operation of said mechanism for moving the switch-tongue in opposite directions, and pneumatic means for cushioning the movement of the core of said solenoid.

23. In a switch-operating mechanism for electrical railways, the combination with the main and switch rail sections of a railway-track provided with a suitable switch-tongue and electrical conductor, of a circuit-breaker suitably connected to said conductor, a switch-tongue-operating mechanism connected to said switch-tongue, a solenoid, means for forming a switch-throwing circuit for energizing said solenoid when a trolley is in contact with said circuit-breaker and the controller of the trolley operated causing thereby the operation of said mechanism, and pneumatic means for cushioning the movement of the core of said solenoid.

24. In a switch-operating mechanism for electric railways, the combination with the main and switch rail sections of a railway-track provided with a suitable switch-tongue, of an electrical conductor, a circuit-breaker connected thereto, a switch-tongue-operating mechanism, a pair of solenoids arranged above the ground and suitably connected to said mechanism, means in communication with said solenoids, conductor and circuit-breaker for forming a switch-throwing circuit for energizing said solenoids when a trolley is in contact with said circuit-breaker and the controller of said trolley operated causing thereby the operation of said mechanism, and pneumatic means between said mechanism and said solenoid for cushioning the movement of the cores of the latter.

25. In a switch-operating mechanism for electric railways, the combination with the main and switch rail sections of a railway-track provided with a suitable switch-tongue and an electrical conductor, of a circuit-breaker suitably connected to said conductor, a switch-tongue-operating mechanism connected to said switch-tongue and adapted to operate the same, a solenoid connected to said mechanism, means connected to said solenoid, circuit-breaker and conductor for forming a switch-throwing circuit to energize the said solenoid causing the operation of said mechanism for throwing the said switch-tongue, means interposed between said mechanism and said solenoid for cushioning the movement of the core of the latter, and means for automatically locking and releasing said switch-tongue-operating mechanism.

26. In a switch-throwing mechanism for electric railways, the combination with the main and switch rail sections of a railway-track provided with a suitable switch-tongue and an electrical conductor, of a circuit-breaker suitably connected to said conductor, a switch-tongue-operating mechanism connected to said switch-tongue and adapted to operate the same, a solenoid arranged above the ground and connected to said mechanism, means connected to said solenoid, circuit-breaker and conductor for forming a switch-throwing circuit when a trolley is in contact with said circuit-breaker and the controller of the trolley operated and adapted to energize said solenoid, means for automatically locking and releasing said switch-tongue-operating mechanism, and means for cushioning the movement of the core of said solenoid.

27. In a switch-operating mechanism for electric railways, the combination with the main and switch rail sections of a railway-track provided with a suitable switch-tongue and an electrical conductor, of a circuit-breaker suitably connected to said conductor, a switch-tongue-operating mechanism connected to said switch-tongue and adapted to operate the same, a spring-actuated lever connected to said mechanism for operating the same, an adjustable operating-cord, cable or chain connected to said lever for operating the same, a solenoid arranged above the ground and suitably connected to said cord or cable, means connected to said solenoid, circuit-breaker and conductor for forming a switch-throwing circuit for energizing the solenoid when a trolley is in contact with said circuit-breaker and the controller of the trolley operated, and pneumatic means for cushioning the movement of the core of said solenoid.

28. The combination of an electrical conductor, a switch-tongue-operating mechanism suitably connected to a switch-tongue, a solenoid connected to said mechanism, means connected to said conductor and said solenoid for energizing the same causing thereby the operation of said mechanism, and a spring-actuated locking-lever adapted to automatically lock and release said mechanism simultaneously with the operation thereof.

29. The combination of an electrical conductor, a circuit-breaker suitably connected thereto, a switch-tongue-operating mechanism, a solenoid connected to said mechanism and to said circuit-breaker and conductor and adapted when energized to operate said mechanism, means for automatically locking and releasing said mechanism simultaneously with the operation thereof, and pneumatic means for cushioning the movement of the core of said solenoid when energized.

30. The combination of a switch-tongue-operating mechanism suitably connected to a switch-tongue, a solenoid connected to said mechanism and when energized adapted to operate the same, an electrical conductor, a circuit-breaker connected thereto, connections between said circuit-breaker and said conductor and solenoid for energizing the latter when the trolley of a car is in contact with the circuit-breaker and its controller operated, means for automatically locking and releasing said mechanism simultaneously with the operation thereof, means connected to said solenoid for cushioning the movement of the core thereof, and yielding connections arranged upon said mechanism for the purpose set forth.

31. In a switch-tongue-operating mechanism, an operating-wheel 39 provided with a suitably-arranged series of throwing-lugs, a lever 62 for operating said wheel, a spring-actuated means for retaining said lever in an inoperative position, means for limiting the movement of said lever, means operated by said lever for automatically locking and releasing said wheel simultaneously with the operation thereof, a solenoid suitably connected to said lever 62 and adapted to energize to operate the lever, and means for cushioning the movement of the core of said solenoid.

32. In a switch-throwing mechanism, the combination with the operating-wheel 59 suitably connected to and adapted to throw a switch-tongue and provided with a series of notches upon its periphery, of an operating-lever 94 adapted to simultaneously operate with said wheel, and a locking-lever 90 operated by the lever 94 and adapted to be brought into engagement with the said wheel for locking the same.

33. In a switch-throwing mechanism, the combination with the operating-wheel 59 suitably connected to and adapted to throw a switch-tongue and provided with a series of notches upon its periphery, of an operating-lever 94 adapted to simultaneously operate with said wheel, a locking-lever 90 operated by the lever 94 and adapted to be brought into engagement with the said wheel for locking the same, and means connected to the said wheel to prevent the operation of the switch-tongue when the same is obstructed and to allow of the operation of the said wheel.

34. In a switch-throwing mechanism, the combination with a switch-tongue-operating mechanism connected to a switch-tongue and operating means therefor, of a means interposed between the said mechanism and said operating means for cushioning the throw of said switch-tongue consisting of an air-cylinder provided with a suitable exhaust-valve, a piston adapted to frictionally engage the inner face of said cylinder and provided with an air-passage, and a suitable valve connected to said piston for closing said air-passage.

35. In a switch-throwing mechanism, a switch-tongue-operating mechanism suitably connected to a switch-tongue, an adjustable cable, chain or rod connected to said mechanism for operating the same, a solenoid arranged above the ground and connected to said cable, chain or rod for operating the same, means connected to said solenoid and to a source of electrical supply for forming a switch-throwing circuit for energizing said solenoid, and means interposed between said cable, chain or rod and said solenoid for cushioning the movement of the core of the solenoid.

36. In a switch-throwing mechanism, mechanism for operating a switch-tongue, a solenoid suitably connected to said mechanism and adapted when energized to operate the mechanism, means for forming a switch-throwing circuit for energizing the said solenoid, means for automatically locking and releasing said mechanism simultaneously with the operation thereof, and pneumatic means interposed between said solenoid and said mechanism for cushioning the movement during the operation of the former.

37. In a switch-throwing mechanism, an operating-wheel connected to and adapted to throw a switch-tongue and provided with a series of notches upon its periphery, a spring-actuated operating-lever adapted to operate said wheel, a spring-actuated locking-lever 90 operated by said lever and adapted to be brought into engagement with said wheel for locking the same, and operating means for said lever.

38. In a switch-throwing mechanism, an operating-wheel suitably connected to and adapted to throw a switch-tongue in either direction and provided on its periphery with a series of notches, an operating-lever adapted to rotate said wheel, means for operating said lever causing thereby the rotation of said wheel, a locking-lever, and means connected to said locking-lever and operated by said operating-lever for bringing the said locking-lever into engagement with said wheel.

39. In a switch-throwing mechanism, an operating-wheel, connections between said operating-wheel and a switch-tongue for throwing the latter in either direction, a spring-actuated operating-lever adapted to rotate said wheel, a locking-lever, connections between said locking-lever and said operating-lever for operating the former simultaneously with the operation of the latter, and means for operating the said operating-lever causing thereby the rotation of said wheel.

40. In a switch-throwing mechanism, an operating-wheel, suitable rod connections between said wheel and a switch-tongue for throwing the latter in either direction, an operating-lever connected to said wheel for rotating the same, operating means for said lever, a locking-lever, connections between said locking-lever and said operating-lever for causing the former to engage the said wheel simultaneously with the operation of the latter, means mounted upon the said rod connections for preventing the throw of the switch-tongue when the same is obstructed, and means for limiting the movement of the operating-lever.

41. In a switch-throwing mechanism, an operating-wheel provided on its periphery with a series of notches, a spring-actuated lever connected to said wheel and adapted to rotate the same, a locking-lever adapted when operated to engage in the notches of the said wheel, connections between said locking-lever and said operating-lever for operating the former simultaneously with the operation of the latter, a cord, chain or cable connected to said operating-lever and adapted to operate the same, means for limiting the movement of said operating-lever, and means for operating said cord, chain or cable.

42. In a switch-throwing mechanism, an operating-wheel provided on its periphery with a series of notches, a spring-actuated operating-lever connected to said wheel and adapted to rotate the same, a locking-lever adapted when operated to engage in the notches of the said wheel, connections between said locking-lever and said operating-lever for operating the former simultaneously with the operation of the latter, a cord, chain or cable connected to said operating-lever and adapted to operate the same, means for limiting the movement of said operating-lever, a solenoid adapted when energized to operate said cord, chain or cable, and means for cushioning the movement of the core of said solenoid.

43. In a switch-throwing mechanism, an operating-wheel provided on its periphery with a series of notches, a spring-actuated operating-lever connected to said wheel and adapted to rotate the same, a locking-lever adapted when operated to engage in the notches of the said wheel, connections between said locking-lever and said operating-lever for operating the former simultaneously with the operation of the latter, a cord, chain or cable connected to said operating-lever and adapted to operate the same, means for limiting the movement of said operating-lever, a solenoid adapted when energized to operate said cord, chain or cable, and pneumatic means for cushioning the movement of the core of said solenoid.

44. In a switch-throwing mechanism, an operating-wheel provided on its periphery with a series of notches, a spring-actuated operating-lever connected to said wheel and adapted to rotate the same, a locking-lever adapted when operated to engage in the notches of said wheel, connections between said locking-lever and said operating-lever for operating the former simultaneously with the operation of the latter, a cord, chain or cable connected to said operating-lever and adapted to operate the same, means for limiting the movement of said operating-lever, a solenoid adapted when energized to operate the said cord, chain or cable, an air-cylinder interposed between said solenoid and said cord, chain or cable, and a piston operating in said cylinder and suitably connected to said solenoid and said cord, chain or cable and adapted to cushion the movement of the core of said solenoid.

45. In a switch-throwing mechanism, an operating-wheel connected to and adapted to throw a switch-tongue in either direction and provided with a series of notches upon its periphery, a spring-actuated operating-lever adapted to operate said wheel, a spring-actuated locking-lever 90 operated by said lever and adapted to be brought into engagement with the notches of the said wheel for locking the same, operating means connected to the said operating-lever, and an air-cylinder interposed between said operating means and said operating-lever.

46. In a switch-throwing mechanism, an operating-wheel suitably connected to and adapted to throw a switch-tongue in either direction and provided on its periphery with a series of notches, an operating-lever adapted to rotate said wheel, operating means connected to said lever, an air-cylinder interposed between said operating means and said operating-lever, a locking-lever, and means connected to said operating-lever and operated thereby for bringing the said locking-lever into engagement with the notches of said wheel.

47. In a switch-throwing mechanism, an operating-wheel, connections between said operating-wheel and a switch-tongue for throwing the latter in either direction, a spring-actuated operating-lever adapted to rotate said wheel, a locking-lever, and means connected to said operating-lever and operated thereby for bringing the said locking-lever into engagement with said operating-wheel for locking the same, means connected to said operating-lever for operating the same, and an air-cylinder interposed between said operating means and operating-lever.

48. In a switch-throwing mechanism, an operating-wheel, suitable rod connections between said wheel and a switch-tongue for throwing the latter in either direction, an operating-lever connected to said wheel for rotating the same, operating means connected to said lever, an air-cylinder interposed between said operating means and said lever, a locking-lever, connections between said locking-lever and said operating-lever for causing the former to engage the said wheel simultaneously with the operation of the latter, means mounted upon said rod connections to prevent the throw of the switch-tongue when the same is obstructed, and means for limiting the movement of the operating-lever.

49. In a switch-throwing mechanism, an operating-wheel, connections between said operating-wheel and a switch-tongue for throwing the latter in either direction, an operating-lever adapted to rotate said wheel, means connected to said lever for operating the same, an air-cylinder interposed between said operating-wheel and said lever, means connected to said lever for automatically returning the same to an inoperative position, a locking-lever, connections between said operating-lever and said locking-lever for operating the latter simultaneously with the operation of the former, and means for returning said locking-lever to an inoperative position.

50. In a switch-throwing mechanism, an operating-wheel, connections between said operating-wheel and a switch-tongue for throwing the latter in either direction, a spring-actuated operating-lever connected to said wheel for rotating the same, operating means for said lever, and an air-cylinder interposed between said means and said lever for obtaining a gradual movement of the switch-tongue when operated.

51. In a switch-throwing mechanism, the combination with a switch-tongue and an electric circuit, of an independent switch-throwing circuit, an electromagnetic device connected to said independent circuit and to the switch-tongue, and pneumatic means interposed in the connections between said electromagnetic device and the switch-tongue for retarding the instantaneous operation of the latter.

52. In a switch-throwing mechanism, the combination with a switch-tongue and an electric circuit, of an independent switch-throwing circuit, an electromagnetic device connected to said independent circuit, a mechanical device connected to said electromagnetic device and to the switch-tongue, and means interposed in the connections between said electromagnetic device and the mechanical device for obtaining a gradual movement of the switch-tongue when operated.

53. In a switch device of the character described, the combination with a movable switch-tongue, of an independent switch-throwing circuit, an electromagnetic device connected to the switch-throwing circuit and to the switch-tongue, and pneumatic means interposed in the connections between the electromagnetic device and the switch-tongue for obtaining a gradual operation of the latter.

54. In a switch of the class described, the combination with a movable switch-tongue, of a switch-throwing circuit, an electromagnetic device connected to the switch-throwing circuit and to the switch-tongue, and pneumatic means interposed in the connections between the electromagnetic device and the switch-tongue for obtaining a gradual operation of the latter.

55. In a switch-throwing mechanism, the combination with the switch-tongue, of a switch-throwing circuit, an electromagnetic device connected to said circuit, a mechanical device connected to said electromagnetic device and to the switch-tongue, and pneumatic means interposed in the connections between the mechanical and the electromagnetic devices for obtaining a gradual operation of the switch-tongue.

56. In a device of the character described, a movable switch-tongue and a switch-throwing circuit, combined with an electromagnet arranged above the ground and connected to the switch-throwing circuit and to the switch-tongue, with pneumatic means for controlling the movement of the switch-tongue when the latter is actuated.

57. In a device of the character described, a movable switch-tongue and a switch-throwing circuit, combined with an electromagnetic device arranged above the ground, a mechanical device connected to the switch-tongue and to said electromagnetic device, with pneumatic means for controlling the movement of the switch-tongue when the latter is operated.

58. In a device of the character described, a movable switch-tongue, an electrical circuit, and an independent switch-throwing circuit, combined with an electromagnetic device connected to the switch-throwing circuit and to the switch-tongue, with pneumatic means for controlling the movement of the switch-tongue when operated.

59. In a device of the character described, a movable switch-tongue, an electrical circuit, and an independent switch-throwing circuit, combined with an electromagnetic device connected to the switch-throwing circuit, a mechanical device connected to said electromagnetic device and to the switch-tongue, and independent means for obtaining a gradual movement of the switch-tongue when the latter is operated.

In testimony whereof I affix my signature in the presence of two witnesses.

JOHN H. SPANGLER.

Witnesses:
JOHN NOLAND,
E. W. ARTHUR.